Aug. 4, 1936. R. FRIEND 2,049,538
APPARATUS FOR CANNING EDIBLE MATERIALS
Filed Aug. 25, 1934 3 Sheets-Sheet 1
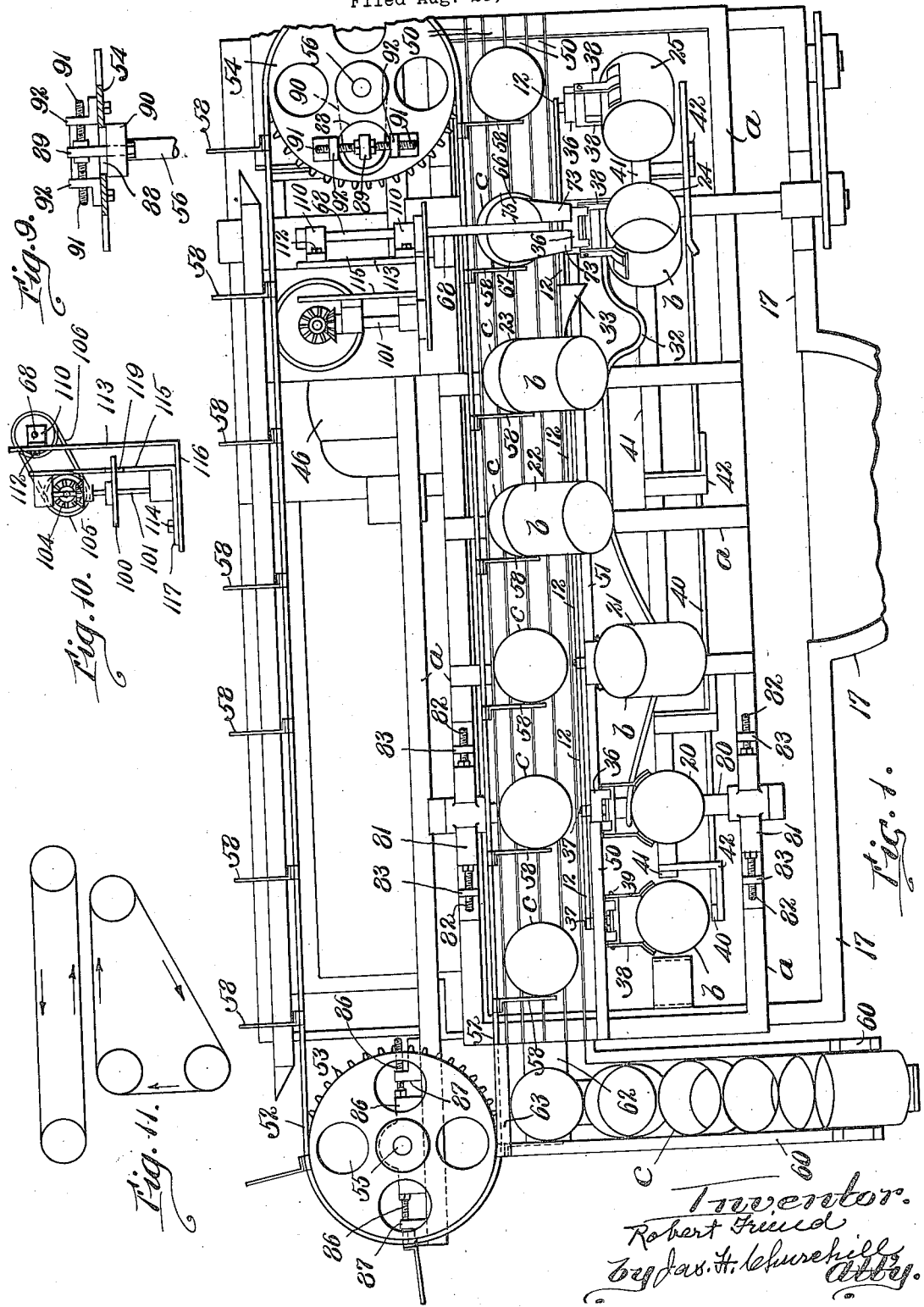

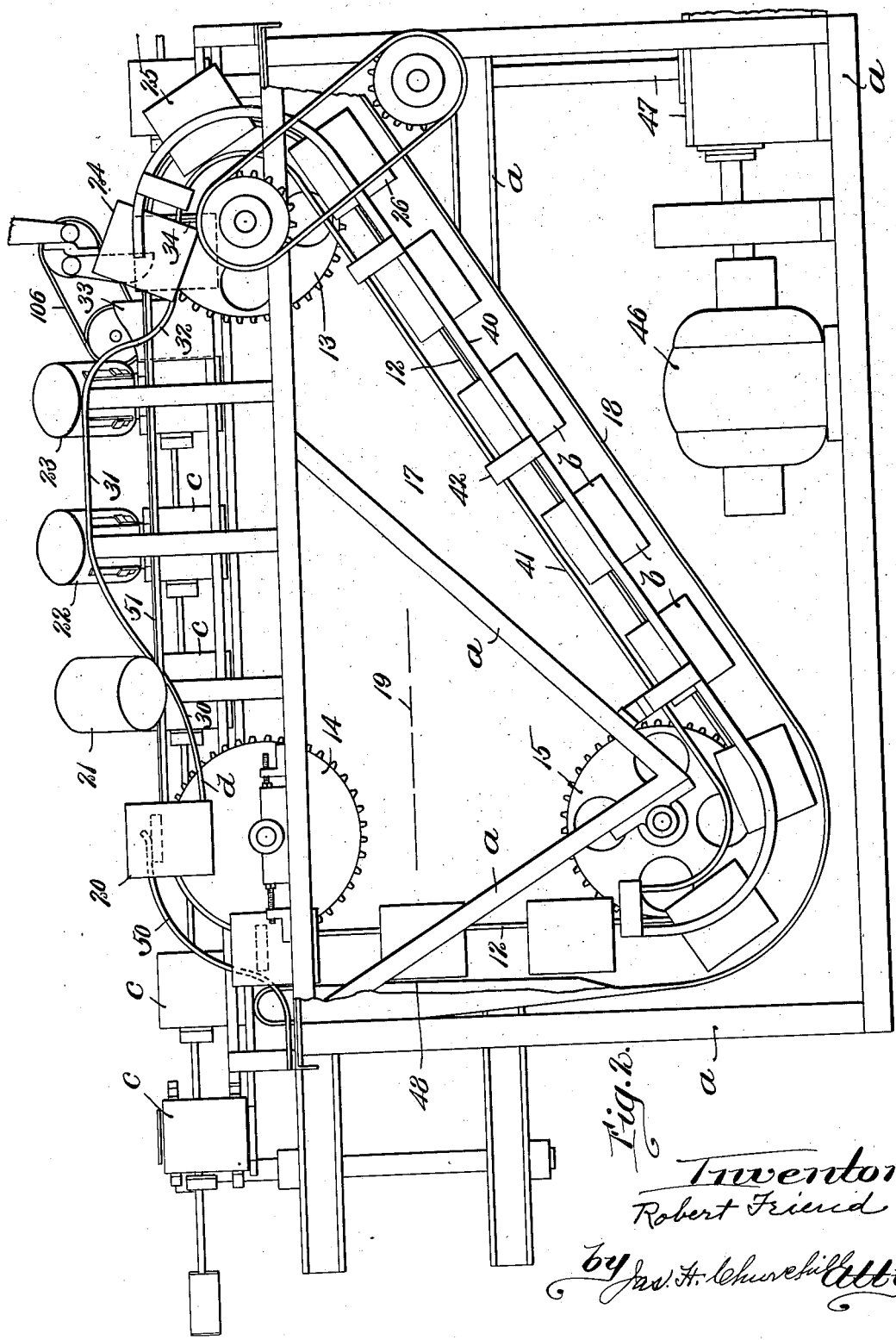

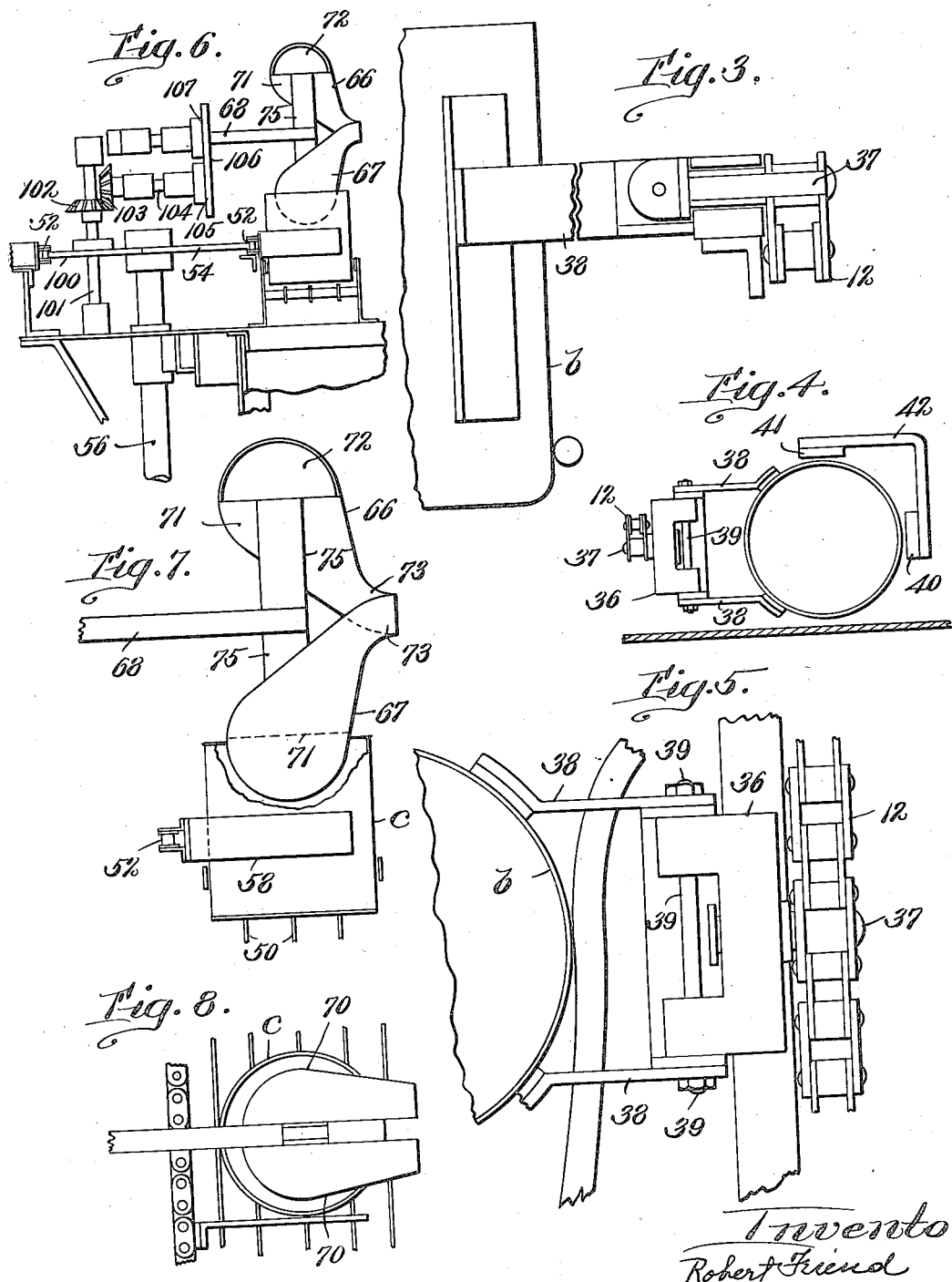

Patented Aug. 4, 1936

2,049,538

UNITED STATES PATENT OFFICE 2,049,538

APPARATUS FOR CANNING EDIBLE MATERIALS

Robert Friend, Melrose, Mass.

Application August 25, 1934, Serial No. 741,522

16 Claims. (Cl. 226—95)

This invention relates to a method of and apparatus for canning liquid or semi-liquid edible materials, such as soups, baked beans and like materials. The invention is particularly adapted for the canning of baked beans, and like materials having more or less liquid present.

The invention has for one of its objects to provide apparatus with which baked beans and like materials may be canned economically and in a hygienic manner.

To this end the material to be canned, which will be hereinafter referred to as baked beans, is placed in mass or bulk in a container or vat, from which it is removed by a plurality of buckets, which are moved through the mass of material to be loaded therewith, and said buckets after being loaded are caused to discharge their loads into cans, and after each bucket has discharged its load, it is caused to be again passed through the mass of baked beans to pick up another load and discharge it into another can.

In canning baked beans, it is desirable to provide each can with a piece of pork to season the beans, and in accordance with this invention, provision is made for avoiding disintegration of the pork and dissemination of the same throughout the mass of beans in the can.

These and other features of this invention will be pointed out in the claims at the end of this specification.

In the accompanying drawings,

Fig. 1 is a plan view of one construction of apparatus embodying this invention;

Fig. 2, a front elevation of the apparatus shown in Fig. 1 with parts broken away;

Fig. 3, a detail in elevation illustrating a portion of a bucket and the universal joint for connecting it with its endless carrier;

Fig. 4, a detail in plan of a bucket and its universal joint together with guides for the bucket;

Fig. 5, a plan of Fig. 3;

Figs. 6, 7 and 8, details illustrating the mechanism for removing a portion of the load from filled cans;

Fig. 9, a detail illustrating an adjusting device for the endless carrier for the cans;

Fig. 10, a detail illustrating the drive for the rotary scoops; and

Fig. 11, a diagrammatic view to illustrate the paths in which the endless carriers for the buckets and cans are moved.

Referring to the drawings, $a$ represents a framework for supporting the operative parts of the apparatus.

The apparatus is provided with a plurality of buckets $b$ which are carried by an endless carrier 12, preferably a link chain, which is engaged with suitable sprocket wheels 13, 14, and 15. The sprocket wheels 13, 14, 15 are arranged substantially in the form of a triangle so as to cause the endless carrier 12 and the buckets $b$ to travel in a substantially vertical plane in a path having a portion or lap inclined downward from the sprocket wheel 13 to the sprocket wheel 15, and having a portion or lap between the sprocket wheels 15, 14 vertically arranged, and a portion or lap between the sprocket wheels 14, 13 horizontally arranged, after the manner represented in Figs. 2 and 10.

The inclined and vertical portions or laps of the triangular path, in which the buckets $b$ are moved, are extended down into a container or vat 17, substantially triangular in shape with an inclined portion 18 substantially close to the inclined buckets $b$.

The vat or container 17 is designed to contain a mass or body of baked beans which is stirred up by the buckets passing through the same, so as to obtain a load of substantially uniform consistency in each bucket. The mass of baked beans is represented in Fig. 2 by the dotted line 19. Each bucket $b$ is closed at its bottom and open at its top, and said buckets are arranged on their endless carrier, so that their open mouths will enter the mass of baked beans as they pass down the inclined path. In this manner each bucket picks up the greater portion of its load and is entirely filled as it is moved up through the mass in the vertical path. The filled bucket is then moved in the substantially horizontal path from the sprocket 14 to the sprocket wheel 13. The filled bucket is suspended from the endless carrier in a vertical position with the open mouth of the bucket uppermost, as the said bucket enters said horizontal path.

This position of each bucket of the endless series of buckets is indicated in Fig. 2 by the bucket marked 20. As the filled bucket is moved along the horizontal path, it is acted upon by a device $d$, which may be designated a cam and which is suitably shaped to tilt the filled bucket from its upright position indicated by the bucket $b$ marked 20, first into the position indicated by the bucket marked 21 (see Fig. 2), and then into the position indicated by the bucket marked 22, in which latter position the filled bucket is in its extreme tilted position with its mouth in its lowermost position, in which position the bucket has its bottom or closed end elevated to such degree as to ensure the load in the bucket being discharged therefrom into one of a series of cans c.

When the bucket has been tilted into its extreme discharging position indicated by the bucket marked 22, it is moved along the cam d a sufficient distance to allow time for all of the load in the bucket to be discharged therefrom, and when this is accomplished, the bucket has been moved into the position indicated by the bucket marked 23.

On further movement of the bucket from the position indicated by the bucket marked 23, the bucket, which is now empty, is turned by a cam 33 back into a substantially vertical position with its mouth uppermost, which position is indicated by the bucket marked 24, and the bucket is then carried around the sprocket wheel 13 and turned into the position indicated by the bucket marked 25 with its mouth downward. The bucket is further turned so as to enter the inclined path as indicated by the bucket marked 26, which position may be considered the starting position of each empty bucket of the series.

In this starting position it will be observed that the open mouth of the empty bucket is presented to the mass of baked beans so as to enter said mass.

The cam d is represented in Figs. 1 and 2 as a rod or bar, which is suitably shaped to effect the movements of the buckets as above described, and is provided as shown with an inclined portion 30 for tilting the bucket into its discharging position, and is also provided with a substantially horizontal portion 31 for keeping the bucket in its discharging position a sufficient length of time to ensure the bucket being emptied, and further is provided with a second inclined portion 32 which permits the empty bucket to be tilted in the reverse direction by the cam 33.

The cam d is secured to the framework a in position to properly function as described.

The cam 33 which effects the reverse tilting of the bucket is suitably supported by the framework a, see Fig. 2.

Each bucket b is secured to the endless chain or carrier 12 by a substantially universal joint, which may be made as herein shown and consists of a member 36 (see Figs. 1, 3, 4 and 5), which has a pivot pin or stud 37 connected with the endless carrier 12, and a second member in the form of arms 38 which are mounted on a pivot rod 39 carried by the member 36.

The bucket b is welded or otherwise secured to the arms 38 and is movable on the pivot rod 39 in a plane transversely of the plane in which the endless carrier 12 travels, and the pivot rod 39 is carried by the member 36 to move therewith, and said member is secured to the endless carrier by the pivot 37 so as to move in a plane substantially parallel with the endless carrier. As a result, the bucket b is pivotally connected with the endless carrier so as to be pivotally movable in the direction in which the endless carrier travels and also to be pivotally movable transversely of the path in which the endless carrier travels.

The transverse pivotal movement enables the loaded buckets to be tilted by the cam d into their discharging position and to be returned to their upright position, and the first of the pivotal movements enables the empty buckets to be turned from an upright position with their mouths uppermost into an inclined position with their mouths lowermost and into their starting position ready to enter the mass of baked beans.

The buckets b have cooperating with them, as they are moved down the inclined path, suitable guides 40, 41 (see Figs. 2 and 4) and said guides are preferably extended so as to partially encircle the sprockets 13, 15. The guide 41 is provided at its upper end with a bent portion 34 which cooperates with the curved upper portion of said guide to turn the bucket on the pivot 37 into the position in which its open mouth may be presented to the mass of baked beans in the vat 17. The guides 40, 41 are connected together by angle irons 42 and are suitably secured to the framework a. The guide 41 cooperates with the inclined bottom 18 of the vat or container to limit the amount the buckets can turn on the pivots 37 while they are traveling downward through the mass of baked beans. The endless chain or carrier 12 for the buckets may be driven in any suitable manner, as for instance by an electric motor 46, which is connected with the sprocket wheel 13 by suitable mechanism 47.

The buckets b filled with baked beans are moved upwardly in a substantially vertical path as they travel from the sprocket wheel 15 toward the sprocket wheel 14, and provision is made for maintaining the buckets in an upright position and for preventing them from being inclined sufficiently to spill some of their loads. To this end, a yielding guide 48 is arranged in the vat or container 17, and said guide is preferably made as a piece of sheet metal, which is bent at its upper end and secured to the framework a above the vat or container 17 and has its lower end extended to near the lowermost sprocket wheel 15 and is suitably shaped at its lower end to be engaged by a bucket as the latter is carried about the sprocket wheel 15, and to cause the bucket to assume the desired vertical position with its mouth uppermost.

After the buckets have been vertically positioned, they are maintained in such position by the guide 48, which is substantially parallel to the vertical leg of the endless carrier 12 and is in such close proximity to the buckets as to have the top edge or the bottom edge of the body portion of the bucket engage the guide 48 if the loaded bucket should be tilted slightly, and thus prevent the bucket being tilted to such amount as to move its upper open end toward or away from the guide 48 sufficiently to spill any material portion of the load.

When the loaded bucket reaches the upper end of its vertical travel, it is carried from said vertical path into the substantially horizontal path with the bucket still in an upright position and with its mouth uppermost.

The loaded bucket is maintained in this upright condition or position by a guide 50, in the form of a metal strip or bar, which is suitably curved and adapted to engage the member 36 of the universal joint for the bucket. The guide 50 retains control of the loaded bucket until the member 36 of the universal joint rests upon a stationary guide 51, shown in Figs. 1, 2, 3 and 5, as an angle iron bar extended substantially the length of the horizontal path. The guide 51 serves to keep the member 36 in its horizontal position while the bucket is being acted upon by the cams d and 33.

While the member 36 of the universal joint is thus prevented from pivoting about its axis 37, the side of the bucket at or near the bottom thereof engages the substantially horizontal front end portion of the cam d. The loaded bucket is thus placed under the control of the cam d, and is caused to be turned thereby on the pivot 39 of the universal joint for the bucket, while said bucket is moved by the endless carrier in contact with the inclined portion 30 of the cam d, and is maintained in its dumping position by the straight portion 31 of said cam.

The buckets b, as they travel through the horizontal path between the sprocket wheels 14, 13, cooperate with the cans c to be filled. These cans are suitably positioned with their open mouths uppermost on a horizontal supporting member 50 located above the vat or container 17 and preferably made of a plurality of parallel pieces or bars spaced apart, after the manner shown in Fig. 1.

Provision is made for moving the cans c lengthwise of the supporting member 50 in unison with the loaded buckets b as the latter are moved in their substantially horizontal path between the sprocket wheels 14, 13. To this end, an endless chain or carrier 52 is passed about sprocket wheels 53, 54, (see Fig. 1), mounted on shafts 55, 56 to turn in a horizontal plane, and said endless chain 52 has secured to it a plurality of pusher bars or arms 58 which are suitably spaced apart, so that each pusher bar or arm will engage a can c and move it lengthwise of the supporting member 50 in unison with a loaded bucket b.

The cans c to be filled may and preferably will be placed in a raceway or chute 60, which is suitably inclined and preferably curved so as to permit the empty cans to be moved down the chute or raceway 60 by gravity, and to position each can upon a platform 62 with its mouth uppermost. The platform 62 is located at the lower end of the raceway 60 and may be an extension of the supporting member 50.

The can c as it is fed upon the platform 62 is positioned on the latter by stop members 63, only one of which is shown in Fig. 1. The stop members 63 may be angle irons or bars attached to the outer wall of the raceway 60 and extended transversely of the latter. The stop members 63 are spaced apart to engage the can body near the top and bottom thereof, and are separated a sufficient distance to permit the pusher arms 58 to pass between them and engage the empty can on the platform so as to move it lengthwise of the supporting member 50 in unison with one of the loaded buckets b, and so that when the loaded bucket begins to be tilted into its discharging position by the cam d, the empty can c which is to receive the load, will be in proper position to receive the load and will be maintained in such position until the bucket is emptied and returned to its upright position by the cam 33. The filled cans c are carried forward toward the end of the supporting member 50 and into position beneath a device for removing a portion of the material in the can, so as to leave a space at the top of the can for the reception of seasoning material. When the material to be canned is baked beans, it is desirable to place in the can a piece of cooked pork. Heretofore in the canning of baked beans, it has been the custom to place the piece of pork in the can before it is filled with the baked beans and so as to rest on the bottom of the can. This practice has been found more or less objectionable in that the weight of the beans on the piece of cooked pork caused the pork to be broken up and small pieces thereof to become distributed throughout the mass of beans, which rendered the beans more or less greasy and objectionable, especially to those users who did not like too much pork.

To avoid these objections and to enable the pork to be removed from the can in its original condition and served separately from the beans, provision is made for removing from the top of the can a portion of the load of beans therein, so as to leave at the top of the can a space for the reception of the piece of cooked pork, which in this case rests upon the mass of beans within the can, and thereby is relieved from the weight of the beans upon it, and, consequently, when the can is opened by the consumer, the piece of pork is intact and capable of being removed from the can and served separately. The device for removing a portion of the load in the filled can is preferably made as herein shown, (see Figs. 6, 7 and 8).

In the present instance two rotary devices or scoops 66, 67 are employed and are affixed to a rotatable shaft 68 so that each scoop enters the open top of a filled can c and picks up a portion of the load in the can, and as the scoop is revolved causes the portion of the load picked up by it to be discharged back into the vat or container 17. The scoops 66, 67 are of like construction, and each is provided with a curved outer member 70, and a substantially flat or straight inner member 71, which cooperates with the curved outer member 70 to form a hollow scoop having on its inner side near its outer end an inlet mouth 72 and at its inner end a smaller outlet or nozzle 73.

The substantially flat inner members 71 of the scoops are suitably fastened to a cross bar 75 secured to the rotatable shaft 68, and said scoops are arranged with respect to the cross bar 75 so that the inlet ends of the scoops are caused in their revolution to enter the open mouths of the filled cans, after the manner represented in Figs. 7 and 8, dip into the baked beans and cause a portion of the baked beans to pass through the inlet mouth 72 of the scoop, and as the latter continues its revolution from its position with the inlet mouth 72 below the shaft 68 to the position in which the inlet mouth 72 is above the said shaft, the baked beans within the scoop are discharged out of the scoop through the outlet end or nozzle 73 into the vat or container 17. The scoops 66, 67 may be adjusted so as to have their inlet mouths 72 extend into the cans different distances to vary the amount of the load removed from the cans, as required or desired. After the portion of the load has been removed from a can, the latter is carried forward on the supporting member and pushed off thereof onto a suitable support, not shown, and into a position wherein the piece of pork may be placed in the can on top of the baked beans therein, after which the cover for the can may be placed thereon so as to seal the can, in the manner now commonly practiced.

Provision is made for keeping under proper tension the endless carrier or chain 12 for the buckets, and to this end, the shaft 80 of the sprocket wheel 14 has its opposite ends mounted in bearing blocks 81 (see Figs. 1 and 2), supported on the framework a of the apparatus, and adjustable thereon by screws or bolts 82 in threaded engagement with stationary members 83 on the supporting frame a.

Similar means are provided for keeping under proper tension the endless chain or carrier 52 for the pusher arms 58. The endless chain or carrier 52 is passed about the sprocket wheels 53, 54, and one of the sprocket wheels, herein shown as the sprocket wheel 53, has its shaft 55 mounted in bearing blocks 85 slidable on the framework

*a* and adjustable by means of screws or bolts 86 in threaded engagement with stationary members 87 on the framework *a*.

It is desirable that the pusher arms 58 should be accurately adjusted so as to engage the cans *c*, and to this end means are provided for obtaining a fine or what may be termed a micrometer adjustment of the endless chain 52 carrying the pusher arms 58.

To this end, the sprocket wheel 54 which drives the endless chain 52 is loosely mounted on its shaft 56 and is provided with a hole or opening 88 up through which is extended a lug 89 on an arm 90 fast on the shaft 56. The lug 89 (see Figs. 1 and 9) is engaged by screws or bolts 91, in threaded engagement with angle irons 92, fast to the upper surface of the loose sprocket wheel 54. It will thus be observed that by adjusting the screws or bolts 91, with relation to the lug 89, the loose sprocket wheel 54 may be turned on its shaft 56 so as to move the link chain 52 in opposite directions to accurately position the pusher arms 58 with relation to the cans *c* and thereby accurately position the cans with relation to the buckets *b*, so that when the buckets are tilted or dumped, the cans will be in proper position to receive the contents of the buckets. The shaft 56 is operatively connected with the motor 46 to be driven thereby, and as the shaft 56 is rotated, it carries with it the crank or arm 90, its lug 89, and effects rotation of the sprocket wheel by means of the adjusting screws 91 and their supporting members 92 which are fast to the sprocket wheel 54.

The rotary shaft 68, to which the scoops 66, 67 are affixed, is driven by the endless chain 52, with which is engaged a sprocket wheel 100 on a shaft 101 (see Figs. 6 and 10), having on it a miter gear 102 which meshes with and drives a miter gear 103 on a shaft 104, provided with a sprocket wheel 105, which is connected by a link chain 106 with a sprocket wheel 107 on the shaft 68.

Provision is made for bodily moving the shaft 68 so as to vary the depth the scoops extend into the cans *c*, and if desired to raise the scoops so that they will not enter the cans. To this end the opposite ends of the shaft 68 are mounted in bearing blocks 110 affixed by bolts 112 to a support 113 secured to the framework *a*. The bolts 112 are tapped into the bearing blocks 110 and are movable in vertical slots, not shown, in the support 113. As the shaft 68 is vertically moved on its support 113, the shafts 101, 104 are moved horizontally to maintain the link chain 106 in working condition or under the desired tension, and for this purpose, the shafts 101, 104 are mounted in bearings carried by a support 115 which is secured to the support 113 by bolts 114 tapped into the support 113 and extended through slots, not shown, in the support 115.

The supports 113, 115 are shown in Fig. 10 as angle irons, having horizontal members 116, 117. The member 116 is secured to the framework *a* and the member 117 is secured to the member 116 by the bolts 114. The endless chain 52 passes through a slot 119 in the upright support 115. In Fig. 6 the supports 113 and 115 are not shown to avoid confusion but appear in Fig. 1.

In the operation of the machine or apparatus, the vat or container 17 is filled or substantially filled with the material to be canned, such for instance, as baked beans, and the machine is put in motion so as to cause the buckets *b* to travel through the baked beans or other material, and thereby effect a thorough mixing or stirring up of the material in the vat before the cans *c* are allowed to enter the machine.

The cans *c* may be prevented from running down the raceway 60 by the operator in any suitable manner, but preferably by inserting a bar, not shown, across the lower end of the raceway. It takes about a minute to effect the proper mixing of the materials in the vat, after which the bar is removed and the cans allowed to be positioned on the platform 62 so as to be moved into the machine by the pusher arms 58 and be carried thereby along the supporting member 50.

The baked beans are cooked prior to being placed in the vat or container and are maintained heated in the vat or container by steam pipes, not shown, or in any other suitable manner.

The scoops are employed where baked beans are to be canned to provide space at the top for the can for the piece of cooked pork, but when some other materials are being canned, the scoops may or may not be used and may be adjusted as above described to raise them above the cans, but it is preferred to use them, inasmuch as they can be adjusted to remove a small portion of the contents of the can, so as to avoid surplus material which may be heaped above the tops of the cans from running over the top of the can and disfiguring the same.

The present method and apparatus for canning materials of a liquid or semi-liquid nature is especially useful in the canning of baked beans, but it is not desired to limit the invention to this particular use, as other materials such as soups and the like may be canned to advantage.

What is claimed is:—

1. In an apparatus of the character described, in combination, a plurality of buckets, an endless carrier for said buckets movable in an endless path having a substantially vertical portion, a substantially horizontal portion and an inclined portion, means for moving a plurality of cans in a path substantially parallel with the horizontal path in which the buckets are moved, and means for tilting said buckets to cause them to discharge their loads into said cans on the passage of said buckets through said horizontal path.

2. In an apparatus of the character described, in combination a container for the material to be canned, a plurality of buckets, a carrier for said buckets movable in an endless path in said container, means for pivoting said buckets to said carrier, means for moving a plurality of cans in a path substantially parallel with a portion of the endless path in which the buckets are moved, and means for tilting the buckets to cause them to discharge their contents into said cans.

3. In an apparatus of the character described, in combination, a container for the material to be canned, a plurality of buckets, an endless carrier for said buckets movable through the material in said container in an endless path in a substantially vertical plane, means for pivotally connecting said buckets with said endless carrier to permit them to be suspended from said endless carrier when loaded and to be tilted transversely with relation to the endless carrier when the load is discharged, means for moving a plurality of cans in a path substantially parallel with a portion of the endless path in which the buckets are moved, means for tilting the buckets transversely of the endless carrier to cause them to discharge their contents into said cans, and means for removing a portion of the material from said cans.

4. In an apparatus of the character described, in combination, a container for the material to be canned, an endless carrier movable in said container, a plurality of buckets pivoted to said endless carrier to be passed through the material in said container and be filled with said material, means for moving a plurality of cans in a path removed from the material in said container, and means for moving said pivoted buckets transversely of said endless carrier to cause them to discharge their loads into said cans.

5. In an apparatus of the character described, in combination, a container for the material to be canned, an endless carrier movable in the container downward on an incline into the material to be canned, then upwardly out of said material and then in a substantially horizontal direction, a plurality of buckets pivoted to said endless carrier, means to turn said buckets into an inclined position and present their open mouths to the material while being moved downward through said inclined path, means to turn the buckets into a substantially upright position with their mouths uppermost, means to tilt said buckets into an inclined position to cause them to discharge their loads, means to move a plurality of cans into position to be filled by said buckets, and means to return the buckets to their initial position with their mouths inclined downward.

6. In an apparatus of the character described, in combination, an endless carrier provided with a plurality of spaced devices for moving a plurality of cans to be filled with material, a container for said material, a plurality of buckets, an endless carrier to which said buckets are connected to move transversely of the path in which said endless carrier travels, means for moving the said buckets through and out of said material to fill the buckets, and means for causing the buckets to be tilted transversely of the endless carrier and discharge their loads into said cans.

7. In an apparatus of the character described, in combination, a bucket, means for moving it through the material to be canned to load said bucket therewith, means for moving a can into position to be filled by said loaded bucket, and means to cause said bucket to be tilted at an angle to the path in which it is moved while being filled, so as to discharge its load into said can.

8. In an apparatus of the character described, in combination, a stationary container for the material to be canned, a bucket, means for moving it in an endless path and through the material to be canned in said stationary container to load said bucket with said material, and means for tilting said loaded bucket at an angle to said endless path to discharge its load therefrom while said bucket is moving in said endless path.

9. In an apparatus of the character described, in combination, a vat for containing a mass of material to be canned, an endless series of buckets movable through said mass of material to load said buckets and movable out of said vat when loaded, means for supporting a plurality of movable cans with which said buckets cooperate, and means for changing the movement of the buckets to cause them to be tilted at an angle to the endless path and discharge their loads into said cans.

10. In an apparatus of the character described, in combination, a plurality of buckets, an endless carrier movable in a vertical plane for moving said buckets in an endless path, means for tilting said buckets transversely of said endless path in one direction to discharge the load from said buckets, and means for moving the empty bucket in a reverse direction transversely of said endless path while the endless carrier is moving in said vertical plane.

11. In an apparatus of the character described, in combination, a plurality of buckets, an endless carrier for said buckets, means for pivotally connecting said buckets with said endless carrier to enable said buckets to be tilted transversely of said endless carrier and to be tilted in the direction of the length of said endless carrier.

12. In an apparatus of the character described, in combination, a plurality of endless carriers movable in planes substantially at right angles to each other, a plurality of buckets connected with one of said endless carriers, and a plurality of devices connected with the other of said endless carriers for engagement with a plurality of cans to move them in the same direction as said buckets are moved by their endless carrier, means for moving said endless carriers, and means for tilting said buckets transversely with respect to their endless carrier.

13. In an apparatus of the character described, in combination, a plurality of endless carriers movable in planes substantially at right angles to each other, a plurality of buckets connected with one of said endless carriers, and a plurality of devices connected with the other of said endless carriers for engagement with a plurality of cans to move them in the same direction as said buckets are moved by their endless carrier, and means for effecting an adjustment of the tension of said endless carriers, and means for effecting a finer adjustment of one of said endless carriers.

14. In an apparatus of the character described, in combination, a vat, an endless chain of buckets vertically arranged with respect to said vat and movable in an inclined path, a vertical path and a horizontal path, a guide cooperating with said buckets as they are moved in said inclined path downwardly into said vat, and a yielding guide cooperating with said buckets to cause them to assume a vertical position and to limit tilting movement of the buckets while they are being moved vertically upward in said vat.

15. In an apparatus of the character described, in combination, a vat, a plurality of buckets, a carrier for said buckets movable in said vat in a vertical plane and having a substantially horizontal portion above the material in said vat, means for pivotally connecting said buckets to said carrier to move transversely thereof, and means for effecting movement of said buckets transversely of said carrier while the latter is traveling in said vertical plane.

16. In an apparatus of the character described, in combination, a vat, a plurality of buckets, a carrier for said buckets movable in a substantially horizontal path above the material in said vat, means for pivotally connecting said buckets to said carrier to move transversely thereof, means for effecting movement of said buckets transversely of said carrier, and means for turning said buckets in the direction in which their carrier is moved.

ROBERT FRIEND.